(12) United States Patent
Beifus

(10) Patent No.: US 7,466,089 B2
(45) Date of Patent: Dec. 16, 2008

(54) METHODS AND SYSTEMS FOR CONTROLLING AN ELECTRONICALLY COMMUTATED MOTOR

(75) Inventor: Brian L. Beifus, Fort Wayne, IN (US)

(73) Assignee: Regal Beloit Corporation, Beloit, WI (US)

( * ) Notice: Subject to any disclaimer, the term of this patent is extended or adjusted under 35 U.S.C. 154(b) by 8 days.

(21) Appl. No.: 11/564,705

(22) Filed: Nov. 29, 2006

(65) Prior Publication Data
US 2007/0126380 A1    Jun. 7, 2007

Related U.S. Application Data

(60) Provisional application No. 60/741,620, filed on Dec. 1, 2005.

(51) Int. Cl.
*H02P 1/18* (2006.01)
*G05B 11/28* (2006.01)

(52) U.S. Cl. .................. 318/254.1; 318/400.13; 318/400.26; 318/599

(58) Field of Classification Search .......... 318/254, 318/439, 599, 801, 811, 825, 254.1, 400.13, 318/400.26, 722
See application file for complete search history.

(56) References Cited

U.S. PATENT DOCUMENTS

| | | | | |
|---|---|---|---|---|
| 4,642,537 | A | * | 2/1987 | Young .................. 318/400.35 |
| 4,757,241 | A | * | 7/1988 | Young .................. 318/400.13 |
| 4,763,347 | A | * | 8/1988 | Erdman ................ 318/400.22 |
| 5,075,608 | A | * | 12/1991 | Erdman et al. ............. 318/599 |
| 5,739,658 | A | * | 4/1998 | Thompson ................ 318/599 |
| 6,356,044 | B1 | | 3/2002 | Archer |
| 6,369,536 | B2 | | 4/2002 | Beifus et al. |
| 6,765,361 | B1 | | 7/2004 | Beifus et al. |
| 6,895,176 | B2 | | 5/2005 | Archer et al. |
| 2003/0210009 | A1 | * | 11/2003 | Minciunescu ............. 318/599 |

* cited by examiner

*Primary Examiner*—Bentsu Ro
*Assistant Examiner*—Thai Dinh
(74) *Attorney, Agent, or Firm*—Armstrong Teasdale LLP

(57) ABSTRACT

A method for controlling the operation of an electronically commutated motor (ECM) is described. The method includes providing a pulse width modulated signal to an ECM controller and adjusting a duty cycle of the pulse width modulated signal to cause the ECM controller to regulate at least one of a maximum current drawn by the ECM and an average voltage applied to the ECM.

20 Claims, 3 Drawing Sheets

METHODS AND SYSTEMS FOR CONTROLLING AN ELECTRONICALLY COMMUTATED MOTOR

CROSS REFERENCE TO RELATED APPLICATIONS

This application is entitled to the benefit of, and claims priority to, provisional U.S. Patent Application Ser. No. 60/741,620 filed Dec. 1, 2005, and entitled "Methods And Systems For Controlling An Average Voltage Applied To An Electronically Commutated Motor," the entirety of which is hereby incorporated by reference.

BACKGROUND OF THE INVENTION

This invention relates generally to electronically commutated motors, and more specifically, to methods and systems for controlling electronically commutated motors.

Power control systems for electronically commutated motors (ECM), sometimes referred to as brushless direct current (DC) motors, may advantageously utilize pulse width modulation (PWM) techniques for controlling motor operation. More specifically, such brushless DC motor drives may use PWM of the supply voltage to control motor current or applied average voltage. In addition, it is also desirable in certain motor embodiments to implement a current regulation scheme outside of the processing device providing the PWM function, so that the current control function can be independent of the processing device. Having the current control function separate from the processing device increases the robustness of the motor drive by providing a way for motor current to be independently limited in the case of a processing device failure. In various motor applications there may also be reasons to control the motor with constant current and/or with constant voltage, in the same application, switching between the constant current and constant voltage modes when necessary.

BRIEF DESCRIPTION OF THE INVENTION

In one aspect, a method for controlling the operation of an electronically commutated motor (ECM) is provided. The method includes providing a pulse width modulated signal to an ECM controller and adjusting a duty cycle of the pulse width modulated signal to cause the ECM controller to regulate at least one of a maximum current drawn by the ECM and an average voltage applied to the ECM.

In another aspect, a unit for controlling the operation of an electronically commutated motor (ECM) is provided. The unit includes a driver circuit for applying signals to windings of an ECM, the driver circuit coupled to a plurality of gate drivers. The unit also includes a processing device including at least one pulse width modulated (PWM) output, a reference signal output, and a plurality of digital outputs. The unit also includes a network coupling the processing device to the gate drivers. The network is configured to regulate at least one of a maximum current drawn by the ECM and an average voltage applied to the ECM, based on a duty cycle of the at least one PWM output.

In yet another aspect, an electronically commutated motor (ECM) assembly is provided. The ECM assembly includes an ECM and an ECM controller configured to control operation of the ECM. The ECM controller is configured to regulate at least one of a maximum current drawn by the ECM and an average voltage applied to the ECM, based on a duty cycle of a signal generated by the ECM controller.

DETAILED DESCRIPTION OF THE INVENTION

Figure 1:
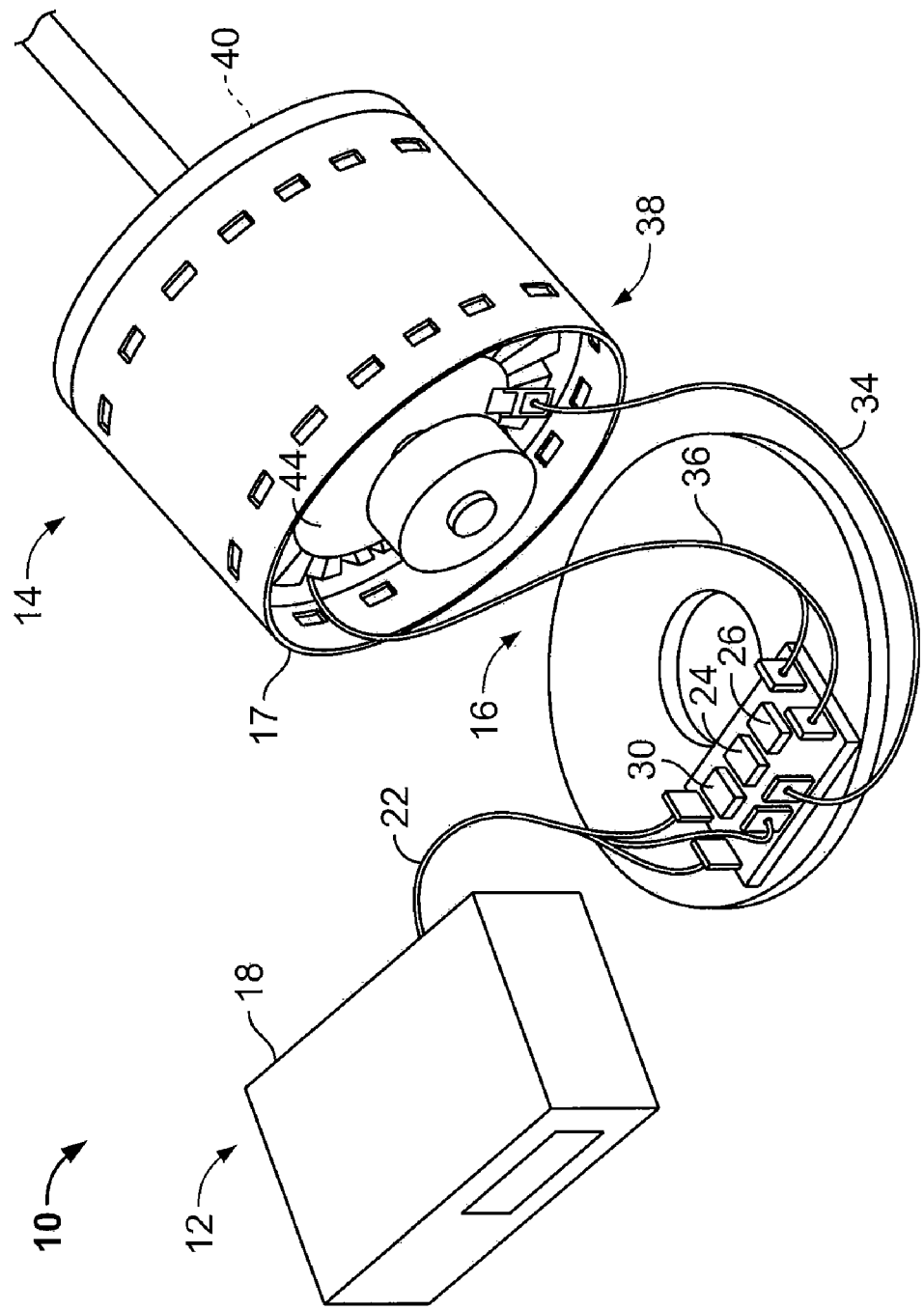
FIG. 1 is an illustration of an electronically commutated motor (ECM) coupled to a motor controller.

FIG. 1 is an illustration of an electronically commutated motor (ECM) control assembly 10 including a control module 12, an ECM 14 (also referred to as a permanent magnet DC brushless motor) and an end shield 16. When fully assembled, end shield 16 and the components mounted thereon, are mechanically coupled to a motor shell 17. Control module 12 includes an enclosure 18 and a printed circuit board (within enclosure 18). In one embodiment, the printed circuit board includes a processing device, for example a microprocessor, configured to control output signals from the printed circuit board in order to control the operating characteristics of ECM 14.

In another embodiment, the printed circuit board is populated with a plurality of electronic components (not shown) coupled to the printed circuit board and each other to control output signals from the printed circuit board in order to control the operating characteristics of ECM 14. The configuration of the microprocessor and the electronic components is variable, based on at least one requirement of a user. In an exemplary embodiment, control module 12 is mounted remotely from ECM 14 and end shield 16. In another embodiment, control module 12 is mounted to an external surface of ECM 14. In still another embodiment, a plurality of control modules are electrically coupled serially, each control module configured to control a motor operating characteristic.

Control module 12 is electrically coupled to ECM 14 and end shield 16 by a cable 22. Control module 12 is also electrically coupled to a user's power supply and interface circuitry (not shown). The components mounted on end shield 16 include, in one embodiment, a bridge inverter 24 which is electrically coupled to a gate drive circuit 26. Bridge inverter 24 and gate drive circuit 26 are electrically coupled to a low voltage power supply 30. Gate drive circuit 26 is electrically coupled to a motor rotor position sensing circuit by a cable 34. Gate drive circuit 26 is also electrically coupled to ECM 14 by a cable 36.

ECM 14 is a basic permanent magnet DC brushless motor. In the exemplary embodiment, ECM 14 includes a single phase salient pole stator assembly, indicated generally at 38, including a stator core 40 formed from a stack of laminations made of a highly magnetically permeable material, and windings (not shown) of magnet wire wound on stator core 40 in a way known to those of ordinary skill in the art. A rotor 44 includes a rotor core (not shown) formed from a stack of laminations made of a magnetically permeable material substantially received in a central bore of stator core 40. Rotor 44 and stator 38 are illustrated as being solid in FIG. 1 for simplicity, their construction being well known to those of ordinary skill in the art. While FIG. 1 is an illustration of a single phase ECM and associated control circuitry, three phase ECMs and similar associated control circuitry are also known.

Figure 2:
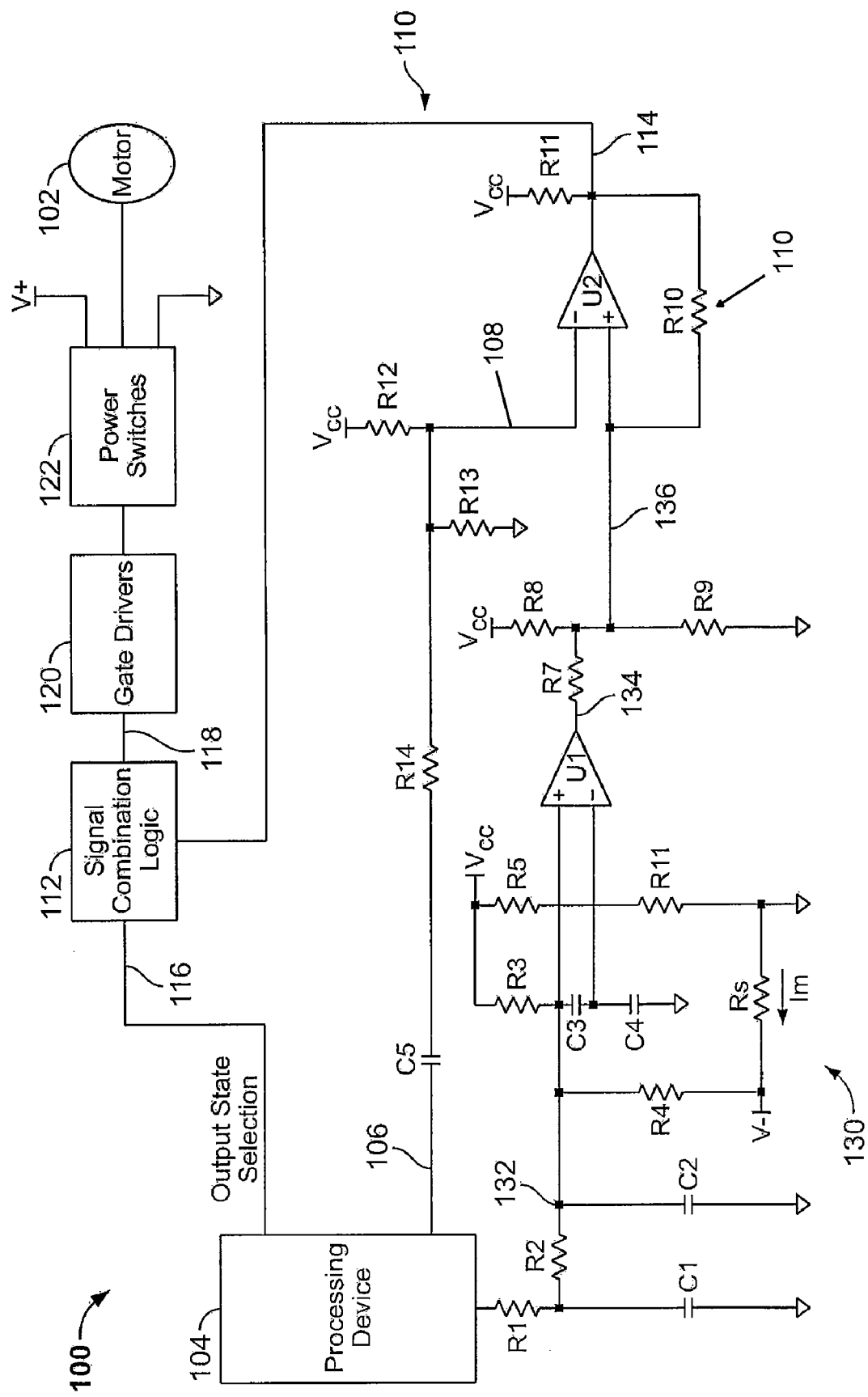
FIG. 2 is a schematic diagram of a motor controller for an ECM.

FIG. 2 is a schematic diagram of a motor controller 100 for an ECM 102. Motor controller 100 is configured to achieve voltage control of ECM 102 while adding minimal or no circuitry to the existing circuitry already devoted to current control. In addition, while motor controller 100 includes a processing device 104, for example, a microcontroller, motor controller 100 is further configured to limit the maximum current drawn by ECM 102 even if microcontroller 104 experiences a fault condition.

Referring specifically to motor controller 100, a pulse width modulated (PWM) output 106 of microcontroller 104 is capacitively coupled through a capacitor, identified as C5, to an input 108 of a comparator, identified as U2. In another exemplary embodiment, U2 may be a flip-flop. A switching circuit 110 includes U2. A signal combination logic 112 combines an output 114 of U2 and an output state selection 116, or a plurality of output state selections, from microcontroller 104. The number of output state selections is dependent upon the number of phases of ECM 102. Outputs 118 of signal combination logic 112 are used to drive gate drivers 120, which are utilized to control operation of power switch drivers 122.

Figure 3:
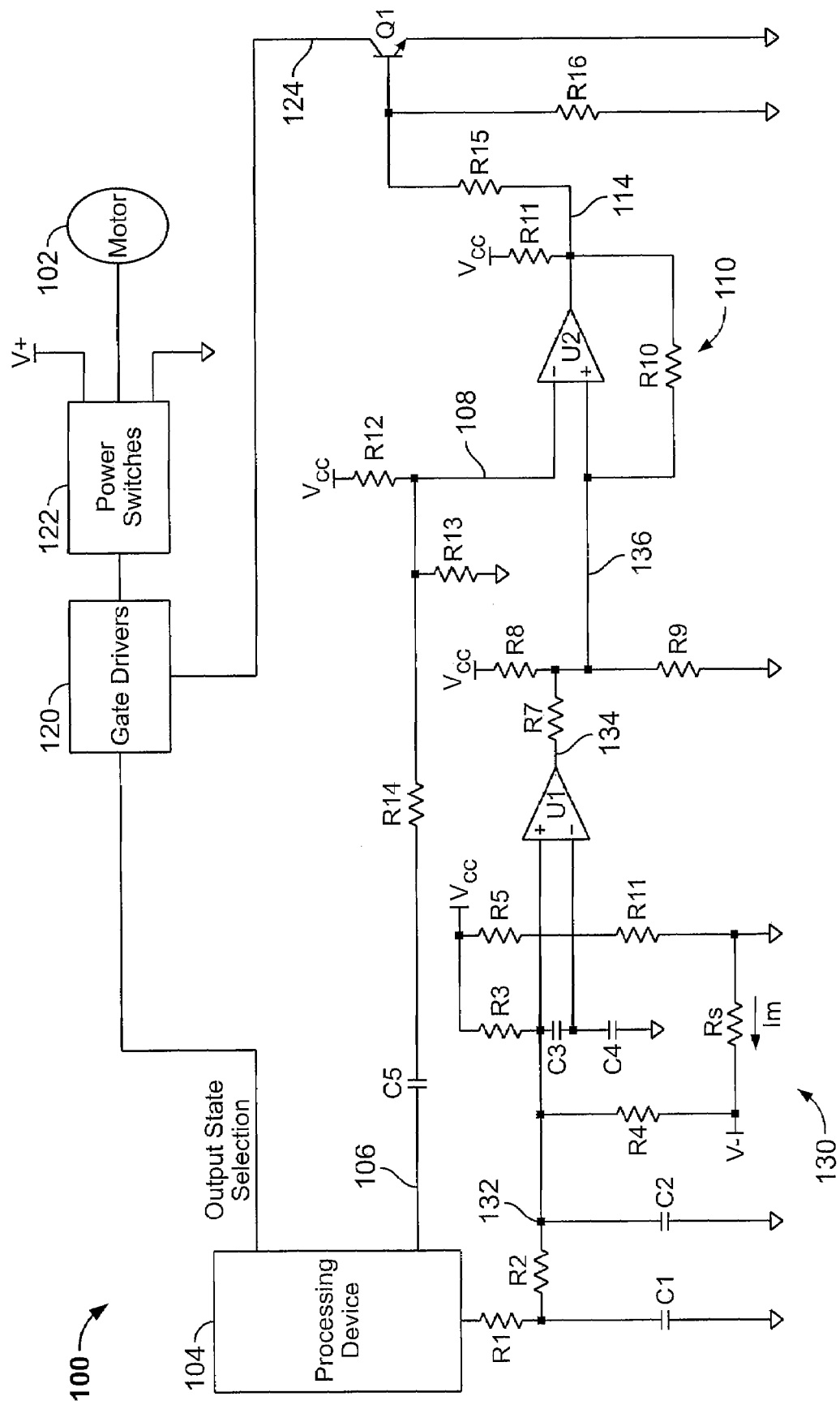
FIG. 3 is a schematic diagram of a motor controller for an ECM.

FIG. 3 is a schematic diagram of a motor controller 100 for an ECM 102. FIG. 3 includes an exemplary embodiment of signal combination logic 112. Signal combination logic 112 may be configured such that an output 114 of U2 is used to drive a transistor switch Q1. A collector 124 of Q1 connects to logic inputs of gate drivers 120, which are utilized to control operation of power switch drivers 122. In one embodiment, a logically high state for output 114 of U2 corresponds to an ON state for power switch drivers 122. In another embodiment, signal combination logic 112 may be configured such that a logically low state for output 114 of U2 corresponds to an ON state for power switch drivers 122.

Referring further to FIGS. 2 and 3, in an exemplary embodiment, motor controller 100 includes a current sensing circuit 130, which includes a comparator, identified as U1. Current sensing circuit 130 also includes a resistor network including a sensing resistor, identified as Rs. Microcontroller 104 provides a reference signal 132 to U1. Reference signal 132 passes through the illustrated combination of a resistor R1, a capacitor C1, and a resistor R2, and corresponds to a desired maximum current level to be drawn by ECM 102. Current sensing circuit 130 is configured such that when the current drawn by ECM 102, as sensed at Rs, is above the desired current level, an output 134 of U1 changes to a logically low state. Output 134 of U1 is provided to an input 136 of U2, such that when the current drawn by ECM 102 is sensed by Rs and U1 to be above the desired current level and U1 transitions to a logically low state, the output of U2 also transitions to a logical low or OFF state. For example, when output 134 of current sensing circuit 130 transitions to a logically low state, U2 of switching circuit 110 is configured to transition to a logical low, or OFF state. As stated above, in one embodiment, a logically high state at output 112 corresponds to an ON state for power switch drivers 122, and a logically low state at output 112 corresponds to an OFF state for power switch drivers 122. As also stated above, the logic configuration may be inverted using known circuit substitutions.

U2 is configured such that an initial high-to-low transition of PWM signal 106 causes U2 to switch into an ON state. Once U2 is in an ON state, the return transition of PWM signal 106 will not transition gate drivers 120, or power switch drivers 122, to an OFF state if there is still a demand for current at ECM 102. Once U2 is in an OFF state, U2 will not transition back to an ON state until the beginning of the next PWM cycle 106 from microcontroller 104.

The relative capability of PWM signal 106 to switch ON output 114 of U2, as compared to the capability of current sensing circuit 130 to switch OFF output 114 of U2, is controlled by resistor scaling networks. The combination of a resistor scaling network including resistors identified as R12, R13, and R14, and a resistor scaling network including resistors identified as R7, R8, and R9 is configured with resistance values such that at the beginning of the pulse width modulation period, PWM signal 106 has a greater impact over the operation of U2 than does output 134 of current sensing circuit 130. However, this impact decreases over time.

Since PWM signal 106 is capacitively coupled to U2, the contribution of PWM signal 106 to the operation of U2 reduces over time, by a time constant defined by the combination of C5, R12, R13, and R14. The time constant thereby limits to a predictable level the motor current that can result if PWM signal 106 remains in a logically high or low state, as could occur if microcontroller 104 experiences a fault condition.

Operating together, current sensing circuit 130 and U2 constitute a peak current regulation function when the ON pulse width from microcontroller 104 (i.e., PWM signal 106) is short relative to its period (e.g., a 2% duty cycle). When operating in this mode, a level of the peak motor current is controlled based on an amount of current, identified as Im, passing through sensing resistor, Rs.

However, regulating the peak current drawn by ECM 102 is not the only control provided by motor controller 100. The average voltage applied to ECM 102 can also be controlled. To achieve voltage control, the ON pulse width of PWM signal 106 is increased (i.e., the duty cycle is increased), such that it is not short relative to its period as it is when motor controller 100 serves a current regulation function. Also, to achieve voltage control, current reference signal 132 is set to a low value. Under these conditions, the regulation provided by current sensing circuit 130 is a constant voltage regulation, with the average voltage being determined by the duty cycle of PWM signal 106. Under these conditions, the voltage regulation has precedence over the current regulation. As such, a low-to-high transition of PWM signal 106 may transition U2 into an OFF state even if the current reference is not satisfied.

To summarize, a peak current regulation circuit, for example, current sensing circuit 130, is responsive to a current reference command originating from microcontroller 104 and the sensed motor current passing through a single shunt resistor, Rs, returning from a direct current voltage supply. A second control method is provided in the same circuitry to optionally control the average voltage applied to the motor, rather than controlling peak current applied to the motor.

A system and method for controlling operation of electronically commutated motors is described above. The motor control system utilizes a current regulation circuit that is responsive to a current reference signal originating from a processing device and a sensed motor current. The sensed motor current passes through a resistance and originates from a direct current voltage supply. The motor control system also is configured in such a way that upon a processing device failure, the motor current remains limited. The configuration also provides a mechanism for controlling an average voltage applied to the motor from a PWM source, rather than controlling a peak current applied to the motor.

While the invention has been described in terms of various specific embodiments, those skilled in the art will recognize that the invention can be practiced with modification within the spirit and scope of the claims.

What is claimed is:

1. A method for controlling operation of an electronically commutated motor (ECM), said method comprising:

providing a pulse width modulated signal to an ECM controller; and adjusting a duty cycle of the pulse width modulated signal to cause the ECM controller to regulate a maximum current drawn by the ECM and an average voltage applied to the ECM, switching between the regulation of the maximum current and the regulation of the average voltage by selecting a first duty cycle to cause the ECM controller to regulate the maximum current drawn by the ECM and a second duty cycle to cause the ECM controller to regulate the average voltage applied to the ECM.

2. A method according to claim 1 wherein providing the pulse width modulated signal to the ECM controller comprises configuring a processing device to supply the pulse width modulated signal to the ECM controller.

3. A method according to claim 1 wherein selecting a first duty cycle to cause the ECM controller to regulate the maximum current drawn by the ECM and a second duty cycle to cause the ECM controller to regulate the average voltage applied to the ECM further comprises selecting a higher duty cycle to cause the ECM controller to regulate the average voltage applied to the ECM than is selected to cause the ECM controller to regulate the maximum current drawn by the ECM.

4. A method according to claim 1 further comprising providing a reference signal to the ECM controller to set a maximum current level.

5. A method according to claim 4 wherein providing the reference signal to the ECM controller comprises configuring a processing device to supply the reference signal to the ECM controller.

6. A method according to claim 4 wherein providing the reference signal to the ECM controller to set the maximum current level further comprises at least one of:
providing the ECM controller with a first reference signal to cause the ECM controller to regulate the maximum current drawn by the ECM; and
providing the ECM controller with a second reference signal to cause the ECM controller to regulate the average voltage applied to the ECM, wherein the first reference signal is higher than the second reference signal.

7. A method according to claim 1 further comprising configuring the ECM controller to regulate the current drawn by the ECM even upon failure of the processing device.

8. A unit for controlling the operation of an electronically commutated motor (ECM), said unit comprising:
a driver circuit for applying signals to windings of the ECM, said driver circuit coupled to a plurality of gate drivers;
a processing device comprising at least one pulse width modulated (PWM) output, a reference signal output, and a plurality of digital outputs; and
a network coupling said processing device to said gate drivers, said network configured to regulate a maximum current drawn by said ECM and an average voltage applied to said ECM, switching between the regulation of maximum current and the regulation of average voltage based on a duty cycle of the at least one PWM output.

9. A unit according to claim 8 wherein said network comprises at least one comparator as part of a current sensing circuit that receives the reference signal output from said processing device.

10. A unit according to claim 9 wherein said comparator is configured to compare a measured current drawn by said ECM to a current level that corresponds to the reference signal output from said processing device.

11. A unit according to claim 9 wherein said network comprises a switching circuit that receives an output from said at least one comparator and the PWM signal from said processing device.

12. A unit according to claim 11 wherein said switching circuit is configured to drive a transistor switch connected to logic inputs of said gate drivers.

13. A unit according to claim 11 wherein said switching circuit is capacitively coupled to said processing device to provide a current control of said ECM even upon failure of said processing device.

14. An electronically commutated motor (ECM) assembly comprising:
the ECM; and
an ECM controller configured to control operation of said ECM, said ECM controller configured to regulate a maximum current drawn by said ECM and an average voltage applied to said ECM, switching between the regulation of maximum current and the regulation of average voltage based on a duty cycle of a signal generated by said ECM controller.

15. An ECM assembly according to claim 14 wherein said ECM controller comprises a processing device with an adjustable maximum current level and an adjustable pulse width modulated (PWM) signal.

16. An ECM assembly according to claim 15 wherein said ECM controller is configured to regulate the maximum current drawn by said ECM when said processing device is set with a first PWM signal.

17. An ECM assembly according to claim 16 wherein said ECM controller is configured to regulate the average voltage applied to said ECM when said processing device is set with a second PWM signal, wherein said second PWM signal has a higher duty cycle than said first PWM signal.

18. An ECM assembly according to claim 15 wherein said ECM controller is configured to regulate the maximum current drawn by said ECM when said processing device is set with a first maximum current level.

19. An ECM assembly according to claim 18 wherein said ECM controller is configured to regulate the average voltage applied to said ECM when said processing device is set with a second maximum current level, wherein said second maximum current level is lower than said first maximum current level.

20. An ECM assembly according to claim 15 wherein said ECM controller is configured to provide a current control of said ECM even upon failure of said processing device.

* * * * *